(12) United States Patent
Park et al.

(10) Patent No.: US 11,196,070 B2
(45) Date of Patent: Dec. 7, 2021

(54) MEMBRANE-ELECTRODE ASSEMBLY FOR FUEL CELLS WITH IMPROVED MECHANICAL STRENGTH AND PROTON CONDUCTIVITY AND METHOD OF MANUFACTURING THE SAME

(71) Applicants: Hyundai Motor Company, Seoul (KR); Kia Motors Corporation, Seoul (KR); Industry Foundation of Chonnam National University, Gwangju (KR)

(72) Inventors: In Yu Park, Seoul (KR); Jong Kil Oh, Gyeonggi-do (KR); Bo Ki Hong, Seoul (KR); Aniket Kumar, Gwangju (KR); Sun Ju Song, Gwangju (KR); Jae Woon Hong, Jeollanam-do (KR)

(73) Assignees: Hyundai Motor Company, Seoul (KR); Kia Motors Corporation, Seoul (KR); Industry Foundation of Chonnam National University, Gwangju (KR)

( * ) Notice: Subject to any disclaimer, the term of this patent is extended or adjusted under 35 U.S.C. 154(b) by 217 days.

(21) Appl. No.: 16/675,743

(22) Filed: Nov. 6, 2019

(65) Prior Publication Data
US 2020/0274181 A1    Aug. 27, 2020

(30) Foreign Application Priority Data

Feb. 27, 2019   (KR) .................. 10-2019-0023394

(51) Int. Cl.
*H01M 8/1004*    (2016.01)
*H01M 8/1016*    (2016.01)
*H01M 8/1018*    (2016.01)

(52) U.S. Cl.
CPC ....... *H01M 8/1004* (2013.01); *H01M 8/1016* (2013.01); *H01M 8/1018* (2013.01); *H01M 2008/1095* (2013.01); *H01M 2300/0071* (2013.01); *H01M 2300/0082* (2013.01)

(58) Field of Classification Search
CPC ............ H01M 8/1004; H01M 8/1016; H01M 8/1018; H01M 2008/1095; H01M 2300/0071; H01M 2300/0082
See application file for complete search history.

(56) References Cited

U.S. PATENT DOCUMENTS

2016/0036081 A1* 2/2016 Moghaddam ....... H01M 8/1004
                                                                429/483
2016/0064770 A1* 3/2016 Lee .................... H01M 10/056
                                                                429/303
2016/0359183 A1* 12/2016 Rafailovich .......... H01L 51/442

FOREIGN PATENT DOCUMENTS

| EP | 02704239 A1 | 3/2014 |
| JP | 2014-188496 A | 10/2014 |
| KR | 2011-0073222 A | 6/2011 |
| KR | 101550386 B1 | 9/2015 |

(Continued)

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

Disclosed are a membrane-electrode assembly for fuel cells and a method of manufacturing the same. The membrane-electrode assembly for fuel cells may include an electrolyte membrane including a phosphonic acid functionalized graphene oxide in order to improve the mechanical strength and proton conductivity thereof and a method of manufacturing the same.

19 Claims, 6 Drawing Sheets

(56) References Cited

FOREIGN PATENT DOCUMENTS

| | | |
|---|---|---|
| KR | 101550846 B1 | 9/2015 |
| KR | 2018-0017344 A | 2/2018 |

* cited by examiner

MEMBRANE-ELECTRODE ASSEMBLY FOR FUEL CELLS WITH IMPROVED MECHANICAL STRENGTH AND PROTON CONDUCTIVITY AND METHOD OF MANUFACTURING THE SAME

CROSS-REFERENCE TO RELATED APPLICATION

This application claims, under 35 U.S.C. § 119(a), the benefit of priority to Korean Patent Application No. 10-2019-0023394 filed on Feb. 27, 2019, the entire contents of which are incorporated herein by reference.

TECHNICAL FIELD

The present invention relates to a membrane-electrode assembly for fuel cells and a method of manufacturing the same. Particularly, the membrane-electrode assembly for fuel cells may include an electrolyte membrane including a phosphonic acid functionalized graphene oxide in order to improve the mechanical strength and proton conductivity thereof.

BACKGROUND

An electrolyte membrane including a perfluorinated sulfonic acid ionomer has been most widely used in a polymer electrolyte membrane fuel cell field, since the electrolyte membrane exhibits high proton conductivity and high stability in high humidity. Since a pure perfluorinated sulfonic acid ionomer-based electrolyte membrane has a low glass transition temperature and low proton conductivity at high temperatures, however, the mechanical and dimensional stability of the electrolyte membrane may be drastically reduced. For these reasons, a fuel cell having a general perfluorinated ionomer electrolyte membrane applied thereto is only capable of being operated at a limited temperature of 95° C. or less. In addition, since the proton conductivity of the perfluorinated ionomer-based electrolyte membrane mainly depends on a proton conduction mechanism through a sulfonic acid in a place where water exists, it is very important to maintain the electrolyte membrane in the optimum moisture state.

In recent years, attempts to mix a perfluorinated sulfonic acid ionomer-based electrolyte with a graphene oxide have been made in order to improve the proton conductivity and thermal and mechanical properties of the electrolyte membrane. In this case, it is possible to provide a larger number of proton transfer channels and to maintain a larger amount of moisture due to the unique flat structure and wide surface area of the graphene oxide. In addition, it is possible to improve the mechanical properties of the electrolyte membrane.

The above information disclosed in this Background section is provided only for enhancement of understanding of the background of the invention and therefore it may contain information that does not form the prior art that is already known in this country to a person of ordinary skill in the art.

SUMMARY

In preferred aspects, provided is a membrane-electrode assembly including an electrolyte membrane having an improved water uptake property. The membrane-electrode assembly including an electrolyte membrane may have high proton conductivity. Also provided is a membrane-electrode assembly including an electrolyte membrane exhibiting higher proton conductivity than a nafion electrolyte membrane.

Further provided is a membrane-electrode assembly including an electrolyte membrane having improved mechanical and dimensional stability.

The objects of the present invention are not limited to those described above. The objects of the present invention will be clearly understood from the following description and could be implemented by means defined in the claims and a combination thereof.

In one aspect, provide is a membrane-electrode assembly for fuel cells. The membrane-electrode may include an electrolyte membrane and a pair of electrodes provided on a first surface and a second surface of the electrolyte membrane including a graphene oxide. The graphene oxide may include a phosphonic acid ($PO_3H_2$), so the graphene oxide may be functionalized with the phosphonic acid.

The first surface and the second surface of the electrolyte membrane are facing in opposite direction from each other.

The term "functionalized graphene oxide" as used herein refers to containing a functional group (e.g., chemically functional group) in or on a surface of the graphene oxide. Preferably, the functionalized graphene oxide may be functionalized by attaching, for example, forming a covalent bonds through an oxygen-containing functional group thereof, such as a carboxyl group, a hydroxyl group, an epoxy group, to the chemical functional group. In certain embodiments, the functionalized graphene oxide may be functionalized by attaching the phosphonic acid on its surface, and covalent bonds may be formed between the carboxyl group, hydroxyl group, or epoxy group of the graphene oxide and the phosphonic acid.

The electrolyte membrane may suitably include a perfluorinated sulfonic acid ionomer (PFSA).

The electrolyte membrane may include an amount of about 0.01 wt % to 10.0 wt % of the phosphonic acidgraphene oxide based on the total weight of the electrolyte membrane. Preferably, the electrolyte membrane may include an amount of about 0.01 wt % to 10.0 wt % of the phosphonic acid functionalized graphene oxide based on the total weight of the electrolyte membrane.

The electrolyte membrane may have a water uptake rate of about 50% or greater.

The electrolyte membrane may have a proton conductivity of about 0.04 to 0.40 S/cm.

The graphene oxide may suitably include one or more oxygen-containing functional group selected from the group consisting of a carboxyl group, a hydroxyl group, and an epoxy group, and a combination thereof. Preferably, the phosphonic acid may form covalent bonding with oxygen of the oxygen-containing functional group.

The membrane-electrode assembly may further include a pair of ionomer complex membranes, each of which may include a porous reinforcement film. The ionomer complex membranes may suitably be provided between the electrodes and the electrolyte membrane so as to be attached to the opposite surfaces of the electrolyte membrane.

Each of the ionomer complex membranes may further include a perfluorinated sulfonic acid ionomer, and the ionomer may be impregnated into pores in the porous reinforcement film.

The porous reinforcement film may suitably include one or more selected from the group consisting of polytetrafluoroethylene (PTFE), expanded polytetrafluoroethylene (e-PTFE), polyethylene (PE), polypropylene (PP), a polyphenylene oxide (PPO), polybenzimidazole (PBI), polyimide (PI), polyvinylidene fluoride (PVdF), and polyvinyl chloride (PVC).

In another aspect, the present invention provides a method of manufacturing a membrane-electrode assembly for fuel cells. The method may include preparing a first mixture including a phosphonic acid precursor material and a graphene oxide; preparing a second mixture including an active additive and the first mixture; separating the second mixture into a liquid phase and a solid phase; drying the separated solid material to obtain a solid powder; washing the solid powder to obtain a phosphonic acid functionalized graphene oxide (PGO); preparing a third mixture including the phosphonic acid functionalized graphene oxide and a perfluorinated sulfonic acid ionomer solution; preparing an electrolyte membrane by coating and drying the third mixture, and attaching electrodes to a first surface and a second surface of the electrolyte membrane.

The phosphonic acid precursor material may suitably include triethylphosphite $(P(OEt)_3)$.

Preferably, in the preparing the first mixture, an amount of about 0.1 to 1.0 parts by weight of the graphene oxide may be mixed with 100 parts by weight of the phosphonic acid precursor material.

The active additive may include lithium bromide (LiBr).

Preferably, in the preparing the second mixture, an amount of about 0.2 to 2.0 parts by weight of the active additive based on 100 parts by weight of the phosphonic acid precursor material may be introduced to the first mixture-phosphonic acid.

The solid powder may be washed with one or more selected from the group consisting of tetrahydrofuran, dimethylformamide, and water to obtain the phosphonic acid functionalized graphene oxide.

The electrolyte membrane may suitably include an amount of about 0.01 wt % to 10.0 wt % of the phosphonic acid functionalized graphene oxide based on the total weight of the electrolyte membrane.

The method may further include attaching ionomer complex membranes to a first surface and a second surface of the electrolyte membrane before attaching the electrodes. Preferably, each of the ionomer complex membranes may include a porous reinforcement film and pores in a porous reinforcement film may be impregnated with a perfluorinated sulfonic acid ionomer.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
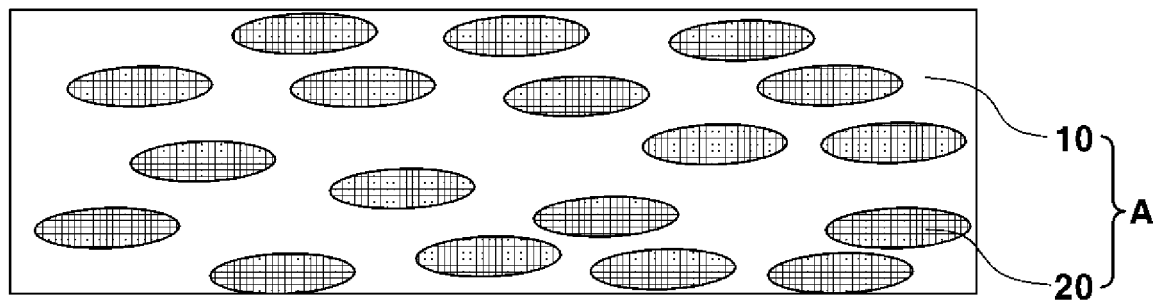
FIG. 1 shows an exemplary electrolyte membrane according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The terminology used herein is for the purpose of describing particular embodiments only and is not intended to be limiting. As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a membrane-electrode assembly for fuel cells and a method of manufacturing the same. Particularly, the membrane-electrode assembly for fuel cells may include an electrolyte membrane including a phosphonic acid functionalized graphene oxide thereby improving the mechanical strength and proton conductivity thereof.

Hereinafter, the membrane-electrode assembly and the method of manufacturing the same will be described individually.

Membrane-Electrode Assembly

The membrane-electrode assembly according to exemplary embodiments of the present invention includes an electrolyte membrane and a pair of electrodes provided on opposite surfaces (a first surface and a second surface) of the electrolyte membrane. The electrolyte membrane may include a graphene oxide, and a phosphonic acid ($PO_3H_2$) may be functionalized in the graphene oxide. The graphene oxide may be functionalized, for example, by attaching the phosphonic acid so as to adding functional groups, e.g., chemically functional groups.

FIG. 1 shows an exemplary electrolyte membrane according to an exemplary embodiment of the present invention. As shown in FIG. 1, the electrolyte membrane A may include a perfluorinated sulfonic acid ionomer (PFSA) 10. Particularly, the electrolyte membrane may include a phosphonic acid functionalized graphene oxide 20 and the perfluorinated sulfonic acid ionomer 10.

The phosphonic acid functionalized graphene oxide 20 may be dispersed in the perfluorinated sulfonic acid ionomer 10. As a result, the water uptake rate and proton conductivity of the electrolyte membrane A may be increased.

In the phosphonic acid functionalized graphene oxide, the graphene oxide may include an oxygen-containing functional group such as a carboxyl group, a hydroxyl group, an epoxy group, and a combination thereof. The phosphonic acid may be functionalized, or attached, as the result of covalent bonding with oxygen of the oxygen-containing functional group.

Graphene is a material in which carbon is bonded in a two-dimensional honeycomb structure, and has the basic form of a carbon-carbon bonded material, whereas the graphene oxide has a form in which a functional group, such as a carboxyl group, a hydroxyl group, or an epoxy group, is bonded to the basic form.

Since the phosphonic acid is directly covalently bonded to the oxygen-containing functional group of the graphene oxide, the number of phosphonic acid functional groups per unit size of a graphene oxide domain may be increased, compared to the case in which the phosphonic acid is functionalized to the graphene oxide using a hydrocarbon chain having a large volume. As a result, the surface roughness of the phosphonic acid functionalized graphene oxide according to exemplary embodiments of the present invention may be increased, and a hydrophilic domain thereof may be extended, whereby the proton conductivity of the electrolyte membrane may be increased. In addition, the phosphonic acid may be directly attached to the graphene oxide by covalent bonding, and excessive swelling of the electrolyte membrane may be prevented.

Because the phosphonic acid is a very strong acid, the corrosiveness thereof may be high. When the phosphonic acid is directly mixed with the perfluorinated sulfonic acid ionomer, the phosphonic acid may leach out during the operation of a fuel cell. When the phosphonic acid is covalently bonded to the graphene oxide and is then mixed with the perfluorinated sulfonic acid ionomer, however, the leaching phenomenon may not occur.

The electrolyte membrane may include an amount of about 0.01 wt % to 10.0 wt %, an amount of about 0.1 wt % to 5.0 wt %, or particularly an amount of about 0.5 wt % to 2.0 wt %, of the phosphonic acid functionalized graphene oxide, based on the total weight of the electrolyte membrane. When the content of the phosphonic acid functionalized graphene oxide is less than about 0.01 wt %, sufficient effect may be obtained by applying the phosphonic acid functionalized graphene oxide. When the content of the phosphonic acid functionalized graphene oxide is greater than about 10.0 wt %, the content of the phosphonic acid functionalized graphene oxide may be excessive, so the brittleness of the electrolyte membrane may be increased and the mechanical strength of the electrolyte membrane may be decreased.

The electrodes are attached to opposite surfaces of the electrolyte membrane. In other words, the electrodes are attached to a first surface and a second surface of the electrolyte membrane, and the first surface is facing in opposite direction from the second surface. Particularly, a fuel electrode (anode), which reacts with external hydrogen gas, and an air electrode (cathode), which reacts with external oxygen gas, are attached to opposite surfaces of the electrolyte membrane.

On the fuel electrode, the external hydrogen gas may be separated into protons (hydrogen cations), and electrons, the separated hydrogen cations move to the air electrode through the electrolyte membrane, which is in contact with the fuel electrode, and the electrons move to the air electrode via a conductive wire connected to the fuel cell. Particularly, each of the fuel electrode and the air electrode includes catalyst particles, and the catalyst particles react with the external oxygen and hydrogen gases and serve as a path for moving the electrons.

The electrode according to various exemplary embodiments of the present invention is not particularly restricted as long as the electrode reacts with external gas in order to move electrons in a conventional fuel cell field. In general, the electrode includes carbon in which platinum particles are dispersed.

The membrane-electrode assembly according to an exemplary embodiment of the present invention may further include ionomer complex membranes. Particularly, the ionomer complex membranes may be provided between the electrodes and the electrolyte membrane such that the electrode and the electrolyte membrane are attached to opposite surfaces of each of the ionomer complex membranes.

Figure 2:
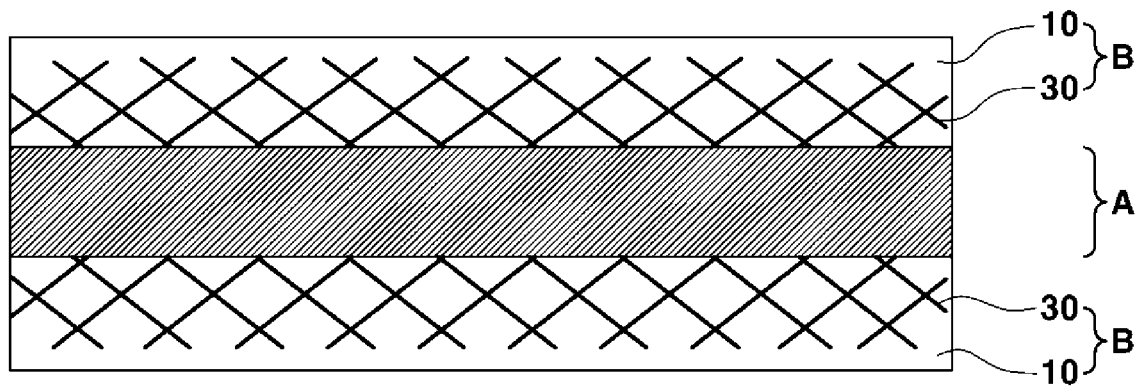
FIG. 2 shows an exemplary embodiment in which ionomer complex membranes are applied to an exemplary electrolyte membrane of the present invention.

FIG. 2 shows exemplary electrolyte membrane and ionomer complex membranes. As shown in FIG. 2, the ionomer complex membranes B may be provided on opposite surfaces of the electrolyte membrane A. Each of the ionomer complex membranes B may include a porous reinforcement film 30 and a perfluorinated sulfonic acid ionomer 10, and the ionomer may be impregrated into pores of the porous reinforcement film 30.

The ionomer complex membranes according to the present invention may improve the proton conductivity of the electrolyte membrane, and may be attached to opposite surfaces of the electrolyte membrane in order to support the electrolyte membrane.

Since a fuel cell is operated at a temperature greater than about 50° C., dehydration may repeatedly occur due to an electrochemical reaction thereof, and therefore wrinkling deformation may occur due to repetitive shrinkage and swelling of the electrolyte membrane. At this time, the ionomer complex membranes may be fixed to opposite surfaces of the electrolyte membrane, which repeatedly shrinks and swells in order to appropriately disperse the stress generated due to the local shrinkage and swelling of the electrolyte membrane, thereby maximally preventing the deformation of the electrolyte membrane.

Method of Manufacturing Membrane-Electrode Assembly

The method of manufacturing the membrane-electrode assembly according to exemplary embodiments of the present invention may include a step of mixing a phosphonic acid precursor material and a graphene oxide to prepare a first mixture, a step of introducing and dispersing an active additive into the first mixture to prepare a second mixture, a step of separating the second mixture into a liquid phase and a solid phase, a step of drying the separated solid material to obtain solid powder, a step of washing the solid powder to obtain a phosphonic acid functionalized graphene oxide (PGO), a step of mixing the phosphonic acid functionalized graphene oxide with a perfluorinated sulfonic acid ionomer solution to prepare a third mixture, a step of coating and drying the third mixture to fabricate an electrolyte membrane, and a step of attaching electrodes to opposite surfaces of the electrolyte membrane.

Figure 3:
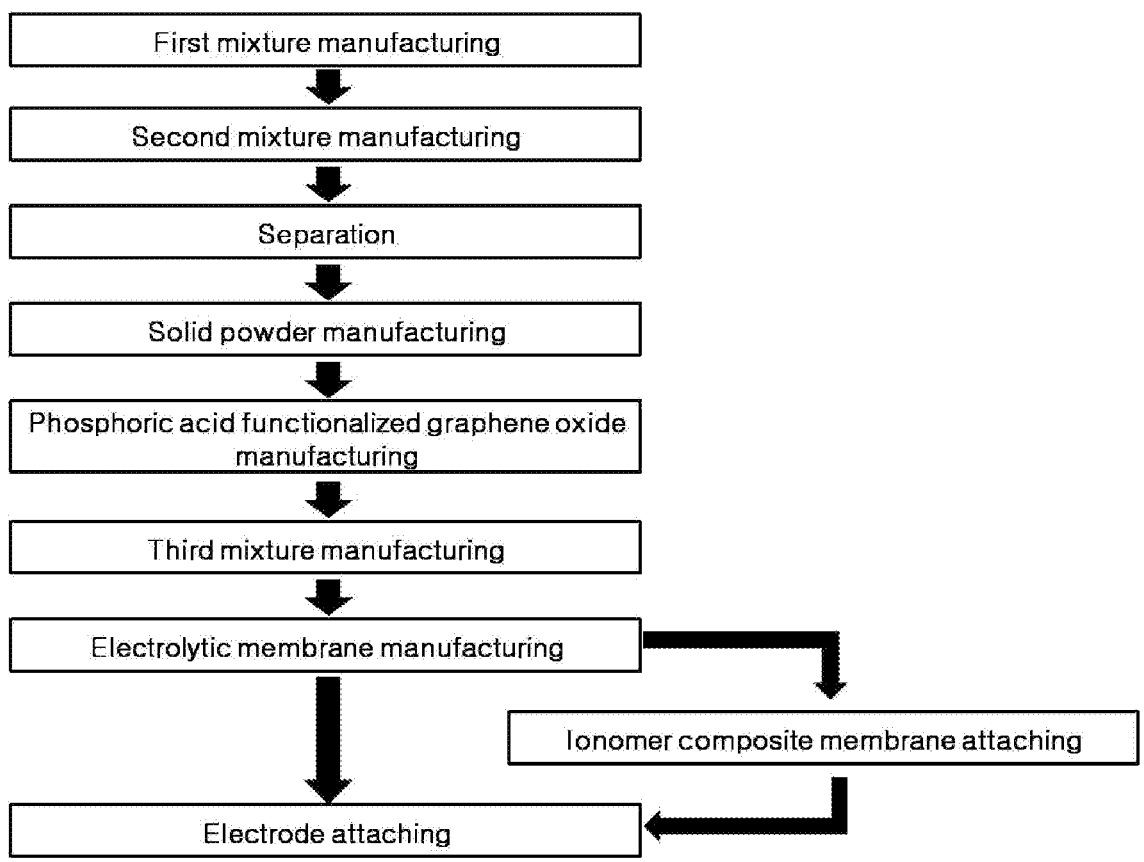
FIG. 3 shows an exemplary process of manufacturing an exemplary membrane-electrode assembly according to an exemplary embodiment of the present invention.

FIG. 3 is a flowchart showing an exemplary process of manufacturing an exemplary membrane-electrode assembly according to the present invention. The respective steps will be described in more detail as shown in FIG. 3.

First Mixture Preparing Step

The first mixture may be prepared by mixing a phosphonic acid precursor material and a graphene oxide. The phosphonic acid precursor material as used herein may provide a phosphonic acid that is functionalized to the graphene oxide. Particularly, the phosphonic acid precursor material may include triethylphosphite (P(OEt)$_3$). Preferably, an amount of about 0.1 to 1.0 parts by weight, or particularly an amount of about 0.1 to 0.5 part by weight, of the graphene oxide may be mixed with 100 parts by weight of triethylphosphite. When the content of the graphene oxide is less than about 0.1 part by weight, the percentage of the phosphonic acid functionalized to the graphene oxide may be reduced, whereby it is difficult to obtain the substantial phosphonic acid functionalization effect. When the content of the graphene oxide is greater than an amount of about 10 parts by weight, reaction efficiency may be reduced.

Since triethylphosphite forms a hydrocarbon chain having a small volume, triethylphosphite may be functionalized to a domain of the graphene oxide at high density.

Second Mixture Preparing Step

The second mixture may be prepared by introducing and dispersing an active additive into the first mixture. The active additive may be added in order to activate an oxygen group present on the surface of the graphene oxide. After activation is completed, the oxygen group may be easily bonded to the phosphonic acid precursor material.

Preferably, the active additive may include lithium bromide (LiBr).

For example, an amount of about 0.2 to 2.0 parts by weight, an amount of about 0.2 to 1.0 parts by weight, and or particularly an amount of about 0.2 to 0.5 parts by weight, of the active additive based on 100 parts by weight of the phosphonic acid precursor material may be introduced to the first mixturephosphonic acid. When the content of the active additive is less than about 0.2 parts by weight, it may be difficult to perfectly activate the oxygen group of the graphene oxide. When the content of the active additive is greater than about 2.0 parts by weight, activation efficiency may be reduced.

Separate dispersion may be performed in order to uniformly mix the active additive with the first mixture. The dispersion may be ultrasonic dispersion (sonication), and may suitably be performed for about 10 to 120 minutes.

Separation Step

The second mixture may be separated into a liquid phase and a solid phase, for example, by stirring, centrifugally separating, and filtering the second mixture in order to separate the second mixture into the liquid phase and the solid phase. It is sufficient to perform a typical separation operation in order to separate the second mixture into the liquid phase and the solid phase. For example, the separation operation may suitably be performed at a temperature of about 80 to 120° C. for about 10 to 50 hours in a nitrogen (N$_2$) atmosphere in order to obtain better results. At this time, the centrifugal separation may be performed at about 3000 to 5000 rpm.

Solid Powder Obtaining Step

The solid powder may be obtained from the solid phase t separated at the separation step. Preferably, drying may be performed at a temperature of about 60 to 90° C. for about 6 to 24 hours.

Phosphonic Acid Functionalized Graphene Oxide Fabrication Step

A phosphonic acid functionalized graphene oxide may be obtained by washing the dried solid powderphosphonic acid. For example, the solid powder may be washed with one or more selected from the group consisting of tetrahydrofuran, dimethylformamide, and water to obtain a phosphonic acid functionalized graphene oxide, preferably one or more times. At this time, final washing may be performed using water. For example, ethoxyl group of triethylphosphite may be changed into a hydroxyl group by washing with water the water, and a phosphonic acid functionalized graphene oxide may be obtained.

Third Mixture Preparing Step

The third mixture may be prepared by mixing the phosphonic acid functionalized graphene oxide with a perfluorinated sulfonic acid ionomer solution to prepare a third mixture.

Preferably, an amount of about 0.01 to 10.0 wt %, or particularly an amount of about 0.1 to 5.0 wt %, based on the total weight of the electrolyte membrane of the phosphonic acid functionalized graphene oxide may be included in the dried electrolyte membrane. When the content of the phosphonic acid functionalized graphene oxide is less than about 0.01 wt %, the water uptake rate and the proton conductivity of the electrolyte membrane may be reduced. When the content of the phosphonic acid functionalized graphene oxide is greater than about 10.0 wt %, the brittleness of the electrolyte membrane may be increased, whereby the mechanical strength of the electrolyte membrane may be decreased.

Electrolyte Membrane Manufacturing Step

The electrolyte may be fabricated by coating the third mixture, for example, on a substrate, and drying the third mixture to fabricate an electrolyte membrane. The coating and drying method is not particularly restricted. It is sufficient to use a coating and drying method that is generally used in the fuel cell field.

Electrode Attaching Step

A fuel electrode (e.g., cathode or anode) and an oxygen electrode may be attached to the opposite surfaces (the first and second surfaces) of the fabricated electrolyte membrane. The attaching step is not particularly restricted, as long as the attaching step is generally used in order to manufacture the membrane-electrode assembly in the fuel cell field.

Ionomer Complex Membrane Attaching Step

Ionomer complex membranes may be applied to the electrolyte membrane in order to improve the durability of the electrolyte membrane as needed. The ionomer complex membranes may be applied to the electrolyte membrane, preferably, before the electrode attaching step. For example, the ionomer complex membranes may be provided between the electrodes and the electrolyte membrane so as to be attached to opposite surfaces of the electrolyte membrane.

Each of the ionomer complex membranes according to the present invention may include a porous reinforcement film and a perfluorinated sulfonic acid ionomer. For example, the ionomer may be impregnated into pores of the porous reinforcement film. The impregnation method is not particularly restricted, as long as it is possible to sufficiently impregnate the pores of the porous reinforcement film with the perfluorinated sulfonic acid ionomer using the impregnation method.

EXAMPLE

Hereinafter, the present invention will be described in more detail with reference to concrete examples. However, the following examples are merely an illustration to assist in understanding the present invention, and the present invention is not limited by the following examples.

Manufacturing Example 300 ml of triethylphosphite (25° C., 0.969 g/ml) was introduced into a round flask, 300 mg of a graphene oxide was added, and stirring was performed for about 2 hours. Subsequently, 800 mg of lithium bromide (LiBr) was added to the graphene oxide dispersed solution, and ultrasonic dispersion was further performed for about 60 minutes. The mixed solution was stirred in a nitrogen atmosphere at a temperature of 100° C. for 48 hours, and centrifugal separation was performed at 4000 rpm in order to separate the solution into a liquid phase and a solid phase. Subsequently, the solid powder filtrate was dried at a temperature of 75° C. for about 12 hours. The finally dried powder was washed using tetrahydrofuran and dimethylformamide, which were mixed at a ratio of 1:1, and was then washed using water to obtain a phosphonic acid functionalized graphene oxide.

Example 1

The phosphonic acid functionalized graphene oxide (PGO) obtained according to the Manufacturing Example was mixed with a perfluorinated sulfonic acid ionomer such that the content of the phosphonic acid functionalized graphene oxide became 0.5 wt %, and the sufficiently mixed solution was applied to a substrate to manufacture an electrolyte membrane.

Examples 2 to 4

The phosphonic acid functionalized graphene oxide was added so as to have the content shown in Table 1, and electrolyte membranes according to Examples 2 to 4 were manufactured using the same method as in Example 1.

TABLE 1

|  | Example 1 | Example 2 | Example 3 | Example 4 |
| --- | --- | --- | --- | --- |
| PGO | 0.5 wt % | 1.0 wt % | 1.5 wt % | 2.0 wt % |

Comparative Example 1

An electrolyte membrane was manufactured using 100% of a perfluorinated sulfonic acid ionomer without adding a phosphonic acid functionalized graphene oxide using the same method as in Example 1.

Experimental Examples

Figure 4:
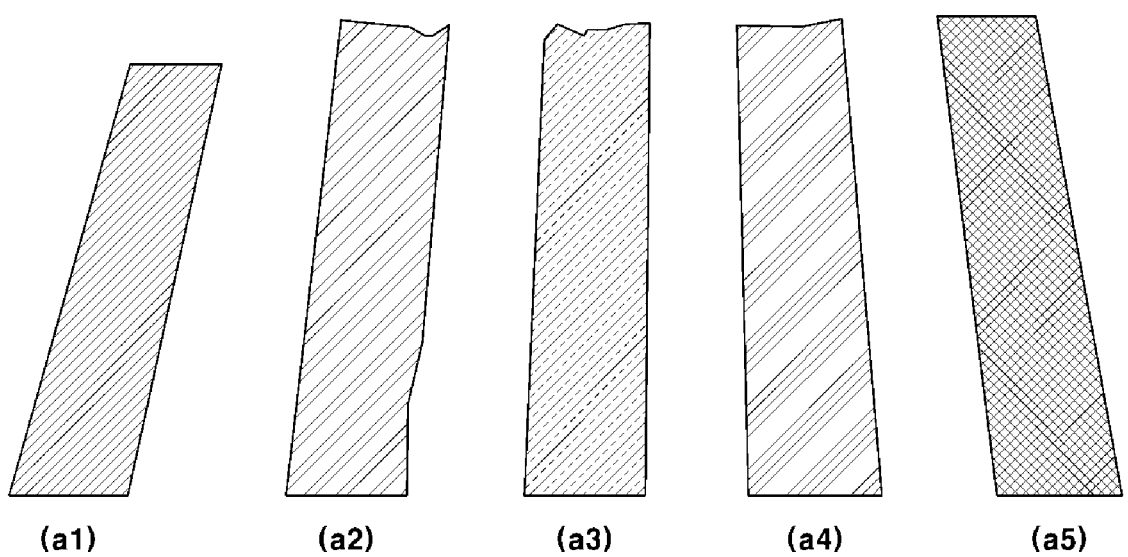
FIG. 4 shows exemplary electrolyte membranes according to the examples of the present invention and a comparative example.

FIG. 4 is a view showing exemplary electrolyte membranes manufactured according to Examples 1 to 4 and Comparative Example 1. In FIG. 4, the electrolyte membrane (a1) according to Comparative Example 1, the electrolyte membrane (a2) according to Example 1, the electrolyte membrane (a3) according to Example 2, the electrolyte membrane (a4) according to Example 3, and the electrolyte membrane (a5) according to Example 4 are shown, and it can be seen that the color of the electrolyte membrane becomes darker as the content of the phosphonic acid functionalized graphene oxide is increased.

The water uptake properties, the proton conductivities depending on temperature, and the proton conductivities depending on relative humidity of the electrolyte membranes were examined, and the results are as follows.

Experimental Example 1 (Water Uptake Properties)

Figure 5:
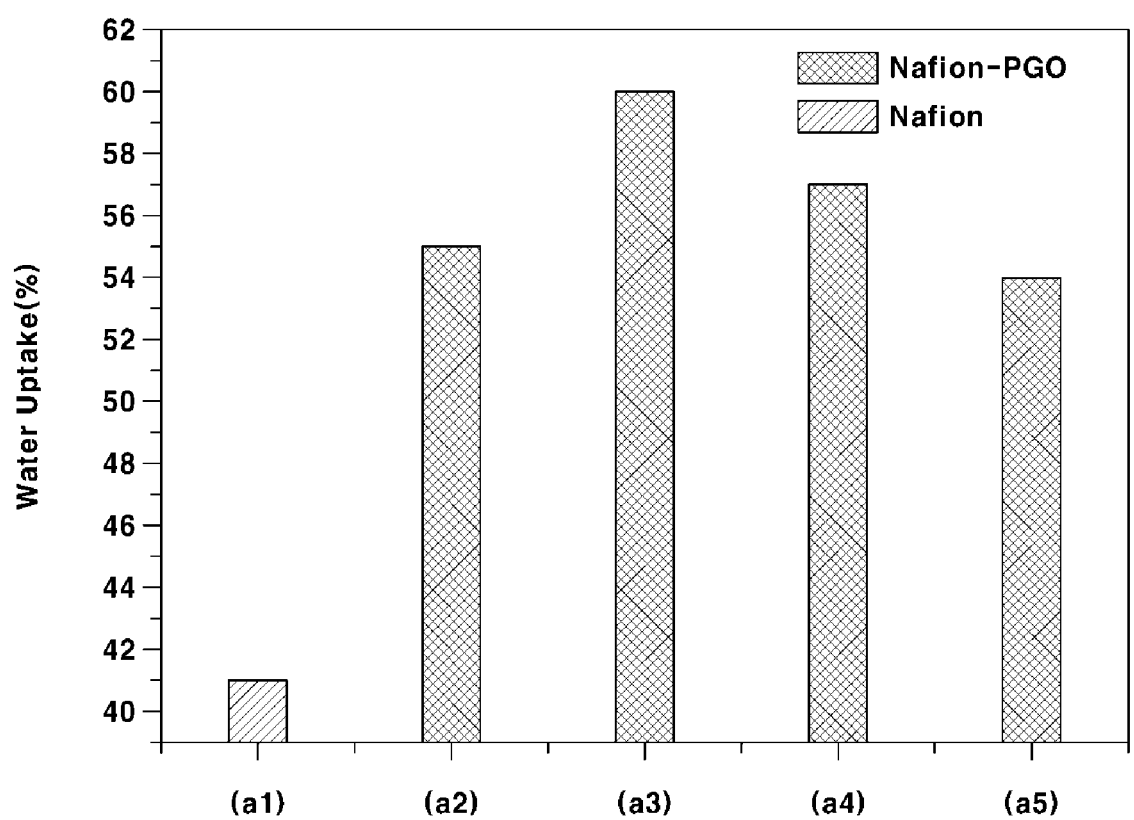
FIG. 5 is a graph showing water uptake properties of exemplary electrolyte membranes according to the examples of the present invention and the comparative example.

FIG. 5 is a graph showing the water uptake properties of the electrolyte membranes according to Examples 1 to 4 and Comparative Example 1.

In the case of Comparative Example 1, it can be seen the electrolyte membrane that was manufactured using the pure perfluorinated sulfonic acid ionomer without adding the PGO had a water uptake property value of about 41%. In the case of Examples 1 to 4, it can be seen that the water uptake rate of each of the electrolyte membranes to which the PGO was added was increased. Particularly, the water uptake rate of the electrolyte membrane according to Example 1 was 55%, the water uptake rate of the electrolyte membrane according to Example 2 was 60%, the water uptake rate of the electrolyte membrane according to Example 3 was 57%, and the water uptake rate of the electrolyte membrane according to Example 4 was 54%.

Experimental Example 2 (Proton Conductivities Depending on Temperature)

Figure 6:
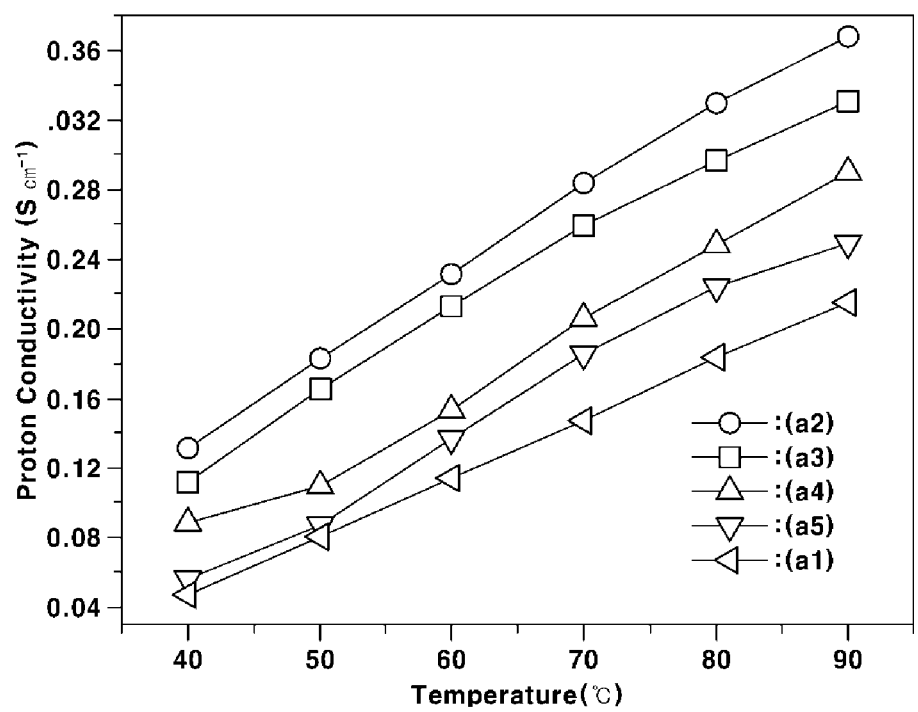
FIG. 6 is a graph showing proton conductivities of exemplary electrolyte membranes according to the examples of the present invention and the comparative example depending on temperature.

FIG. 6 is a graph showing the proton conductivities of the electrolyte membranes according to Examples 1 to 4 and Comparative Example 1 depending on temperature.

The proton conductivity tests were performed at a temperature of 40 to 90° C. and a relative humidity of 100%.

Compared to Comparative Example 1, each of the electrolyte membranes according to Examples 1 to 4 exhibited high proton conductivity over the temperature range. In particular, it can be seen that the electrolyte membrane according to Example 2 had the highest conductivity value.

Experimental Example 3 (Proton Conductivities Depending on Relative Humidity)

Figure 7:
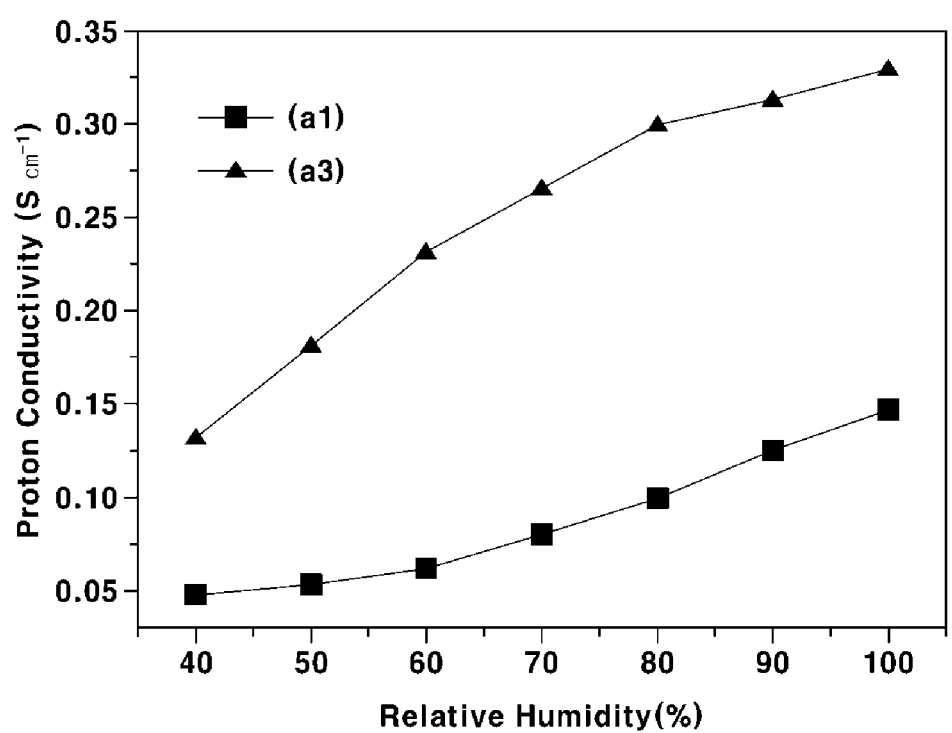
FIG. 7 is a graph showing proton conductivities of exemplary electrolyte membranes according to the examples of the present invention and the comparative example depending on relative humidity.

FIG. 7 is a graph showing the proton conductivities of the electrolyte membranes according to Comparative Example 1 and Example 2 depending on relative humidity.

The electrolyte membrane according to Example 2 exhibited high proton conductivity over the entire relative humidity range. In particular, it can be seen that the proton conductivity of the electrolyte membrane according to Example 2 at a low humidity (40%) was greater than the proton conductivity of the electrolyte membrane according to Comparative Example 1 at a relative humidity of 90% and that the difference in proton conductivity between the electrolyte membrane according to Example 2 and the electrolyte membrane according to Comparative Example 1 was further increased as the relative humidity was increased.

Preferably, provided is a membrane-electrode assembly including an electrolyte membrane having an improved water uptake property. In addition, a membrane-electrode assembly including an electrolyte membrane having high proton conductivity may be provided. Also provide is a membrane-electrode assembly including an electrolyte membrane exhibiting higher proton conductivity than a nafion electrolyte membrane. Further provided is a membrane-electrode assembly including an electrolyte membrane having improved mechanical and dimensional stability.

The effects of the present invention are not limited to those mentioned above. It should be understood that the effects of the present invention include all effects that can be inferred from the foregoing description of the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A membrane-electrode assembly for fuel cells, the membrane-electrode assembly comprising:
   an electrolyte membrane comprising a graphene oxide; and
   a pair of electrodes provided on a first surface and a second surface of the electrolyte membrane,
   wherein the graphene oxide comprises a phosphonic acid ($PO_3H_2$).

2. The membrane-electrode assembly according to claim 1, wherein the graphene oxide is functionalized with phosphonic acid ($PO_3H_2$).

3. The membrane-electrode assembly according to claim 1, wherein the electrolyte membrane comprises a perfluorinated sulfonic acid ionomer (PFSA).

4. The membrane-electrode assembly according to claim 1, wherein the electrolyte membrane comprises an amount of about 0.01 wt % to 10.0 wt % of the graphene oxide comprising phosphonic acid based on the total weight of the electrolyte membrane.

5. The membrane-electrode assembly according to claim 1, wherein the electrolyte membrane has a water uptake rate of about 50% or greater.

6. The membrane-electrode assembly according to claim 1, wherein the electrolyte membrane has a proton conductivity of about 0.04 to 0.40 S/cm.

7. The membrane-electrode assembly according to claim 1, wherein
   the graphene oxide comprises an oxygen-containing functional group selected from the group consisting of a carboxyl group, a hydroxyl group, an epoxy group, and a combination thereof, and
   the phosphonic acid forms covalent bonding with the oxygen of the oxygen-containing functional group.

8. The membrane-electrode assembly according to claim 7, wherein
   each of the ionomer complex membranes further comprises a perfluorinated sulfonic acid ionomer, and
   the ionomer is impregnated into pores of the porous reinforcement film.

9. The membrane-electrode assembly according to claim 7, wherein the porous reinforcement film comprises one or more selected from the group consisting of polytetrafluoroethylene (PTFE), expanded polytetrafluoroethylene (e-PTFE), polyethylene (PE), polypropylene (PP), a polyphenylene oxide (PPO), polybenzimidazole (PBI), polyimide (PI), polyvinylidene fluoride (PVdF), and polyvinyl chloride (PVC).

10. The membrane-electrode assembly according to claim 1, further comprising:
a pair of ionomer complex membranes, each of which comprises a porous reinforcement film,
wherein the ionomer complex membranes are provided between the electrodes and the electrolyte membrane so as to be attached to the first surface and the second surface of the electrolyte membrane.

11. A fuel cell comprising a membrane-electrode assembly of claim 1.

12. A method of manufacturing a membrane-electrode assembly for fuel cells, comprising:
preparing a first mixture comprising a phosphonic acid precursor material and a graphene oxide;
preparing a second mixture comprising an active additive and the first mixture;
separating the second mixture into a liquid phase and a solid phase;
drying the separated solid phase to obtain a solid powder;
washing the solid powder to obtain a phosphonic acid functionalized graphene oxide (PGO);
preparing a third mixture comprising the phosphonic acid functionalized graphene oxide and a perfluorinated sulfonic acid ionomer solution;
preparing an electrolyte membrane by coating and drying the third mixture; and
attaching electrodes to a first surface and a second surface of the electrolyte membrane.

13. The method according to claim 12, wherein the phosphonic acid precursor material comprises triethylphosphite (P(OEt)$_3$).

14. The method according to claim 12, wherein in the preparing the first mixture, an amount of about 0.1 to 1.0 parts by weight of the graphene oxide is mixed with 100 parts by weight of the phosphonic acid precursor material.

15. The method according to claim 12, wherein the active additive comprises lithium bromide (LiBr).

16. The method according to claim 12, wherein in the preparing the second mixture, an amount of about 0.2 to 2.0 parts by weight of the active additive based on 100 parts by weight of the phosphonic acid precursor material is introduced to the first mixture phosphonic acid.

17. The method according to claim 12, wherein the solid powder is washed with one or more selected from the group consisting of tetrahydrofuran, dimethylformamide, and water phosphonic acid.

18. The method according to claim 12, wherein the electrolyte membrane comprises an amount of about 0.01 wt % to 10.0 wt % of the phosphonic acid functionalized graphene oxide based on the total weight of the electrolyte membrane.

19. The method according to claim 12, further comprising:
attaching ionomer complex membranes to the first surface and the second surface of the electrolyte membrane before attaching the electrodes,
wherein each of the ionomer complex membranes comprises a porous reinforcement film and pores in a porous reinforcement film are impregnated with a perfluorinated sulfonic acid ionomer.

* * * * *